United States Patent [19]

Newman

[11] Patent Number: 5,015,712

[45] Date of Patent: May 14, 1991

[54] METHOD FOR PREPARING IMIDE-CONTAINING POLYMERS

[75] Inventor: Thomas H. Newman, Midland, Mich.

[73] Assignee: The Dow Chemical Company, Midland, Mich.

[21] Appl. No.: 420,499

[22] Filed: Oct. 12, 1989

[51] Int. Cl.$^5$ .............................................. C08F 20/58
[52] U.S. Cl. .................................. 526/304; 526/310; 526/347
[58] Field of Search ....................... 526/304, 310, 347

[56] References Cited

U.S. PATENT DOCUMENTS 2,444,536  7/1948  Searle .
3,689,464  9/1972  Holub et al. .
3,766,142  9/1973  Nield et al. .
3,862,918  1/1975  Laurent et al. .
4,080,484  3/1978  Mathias .
4,623,734  10/1986  Kita et al. .

FOREIGN PATENT DOCUMENTS 61-16904  1/1986  Japan .................................... 526/304

*Primary Examiner*—Joseph L. Schofer
*Assistant Examiner*—N. Sarofim
*Attorney, Agent, or Firm*—Price, Heneveld, Cooper DeWitt & Litton

[57] ABSTRACT

Imide-containing polymers of styrene-type monomers are prepared by a process comprising solution polymerizing under free radical polymerization conditions a polymerizable monomer composition comprising at least one vinylaromatic monomer and at least one maleamic monocarboxylic acid monomer.

17 Claims, No Drawings

METHOD FOR PREPARING IMIDE-CONTAINING POLYMERS

BACKGROUND OF THE INVENTION

The present invention relates to imide-modified vinylaromatic polymers and copolymers. Vinylaromatic polymers and copolymers, such as polystyrene, SAN and ABS are important classes of thermoplastic polymeric materials. Their impact resistance, tensile and flexural strength, and elongation values make these polymers extremely useful in fields where strength, durability and ease of manufacture are desired. The polystyrene thermoplastic resins are conventionally molded in sheet form and structural form, designed and adaptable as packaging structures, housings, support structures, furniture molded articles, toys, architectural trim, motor housings, television cabinets, and the like. In many applications, such as vehicles, the building trades, electrical appliances and consumer goods, heat resistance of polymeric materials is a highly desirable property. Like most thermoplastic resins, there is a desire to increase the heat resistance of vinylaromatic resins without negatively detracting from other desirable properties of these polymers.

A variety of approaches to improving heat resistance of thermoplastic vinylaromatic resins have been explored. For example, organic and inorganic fire retardants have been effective but are difficult to homogenously disperse in the polymer, which not only can give rise to poor surface appearance, but can also negatively affect heat resistance. Attempts have also been made to take advantage of the high heat resistance of polyimides by interpolymerizing phenylmaleimide with vinylaromatic monomer compositions. While the resulting interpolymers do exhibit improved heat resistance, the phenylmaleimide monomer significantly raises the cost of the polymer product, because it is difficult to prepare and purify. In addition, it is the only arylmaleimide monomer currently commercially available.

Another approach to preparing imide-containing polymers is to post-imidize maleic anhydride-containing polymers. For example, a styrene-maleic anhydride copolymer may be reacted with a primary amine, such as aniline, to yield a styrene-phenylmaleimide copolymer. The difficulties associated with the use of maleic anhydride in polymerization processes make this approach to imide-containing polymers unattractive.

SUMMARY OF THE INVENTION

In the present invention imide modified vinylaromatic polymers having improved heat resistance are surprisingly prepared by a process comprising solution polymerizing at least one vinylaromatic monomer in the presence of at least one maleamic acid monomer under free radical polymerization and dehydration conditions and separately recovering an imide-containing vinylaromatic polymer. The maleamic acid monomers are easily prepared and purified. The polymerization and in situ imidization proceeds at moderate reaction conditions, even in the substantial absence of a dehydration catalyst. The present invention thus surprisingly economically and conveniently provides vinylaromatic polymers with high heat distortion temperatures.

DESCRIPTION OF THE PREFERRED EMBODIMENT

Imide-containing vinylaromatic polymers having improved heat resistance are produced in accordance with the invention by solution polymerizing under free radical polymerization conditions a polymerizable monomer mixture comprising at least one vinylaromatic monomer and at least one maleamic monocarboxylic acid monomer.

Vinylaromatic monomers, which are employed in forming the imide-containing thermoplastic polymer compositions of the present invention, have the formula $$CH_2=CX-Ar;$$

wherein Ar is an aromatic radical, including various alkyl and halo-ring-substituted aromatic units, of from 6 to 10 carbon atoms and X is hydrogen or an alkyl group having from 1 to 4 carbon atoms. Representative of suitable vinylaromatic monomers include styrene; alpha-alkylmonovinylaromatic compounds such as alpha-methylstyrene, alpha-ethylstyrene, alpha-methyl-vinyltoluene; ring substituted alkylstyrenes such as vinyltoluene, o-ethylstyrene, p-ethylstyrene, 2,4-dimethylstyrene; ring-substituted vinylaromatic compounds such as o-chlorostyrene, p-chlorostyrene, o-bromostyrene, 2,4-dichlorostyrene; ring alkyl/ring halo substituted vinylaromatic compounds such as 2-chloro-4-methyl styrene, 2,6-dichloro-4-methylstyrene and the like; vinylnaphthalene, vinylanthracene, indene, p-cyanostyrene, p-methoxystyrene, and the like. The alkyl substituents generally have 1 to 4 carbon atoms and may include isopropyl and isobutyl groups. If desired, mixtures of such vinylaromatic monomers may be employed.

The vinylaromatic monomers can be copolymerized with up to 30 percent by weight non-vinylaromatic monomers (based on total weight of the two types of monomers). Non-vinylaromatic monomers which are copolymerizable with the vinylaromatic monomers employed in forming the imide-containing vinylaromatic thermoplastic resin compositions of the invention are characterized by the presence of a single olefinically unsaturated group which can be terminally or internally located. Representative ethylenically unsaturated non-vinylaromatic monomers include unsaturated nitriles such as acrylonitrile, methacrylonitrile and ethacrylonitrile; alpha-or beta-unsaturated monobasic acids or derivatives thereof such as acrylic acid, methyl acrylate, ethyl acrylate, butyl acrylate, 2-ethylhexyl acrylate, methacrylic acid and the corresponding esters thereof; acrylamide, methacrylamide, vinylidene chloride, vinylidene bromide, vinyl esters such as vinyl acetate, vinyl proprionate and the like; dialkyl maleates or fumarates such as dimethyl maleate, diethyl maleate, dibutyl maleate, and the corresponding fumarates, vinylidene cyanide and esters of alpha-cyanoacrylic acid.

The maleamic monocarboxylic acids which are interpolymerized with unsaturated monomers to form imide-containing polymers in accordance with the invention are characterized by the formula $$R-NH-CO-CH=CH-CO-OH;$$

wherein R is an alkyl group of 1 to 20 carbon atoms, phenyl, benzyl, cyclohexyl, pyridyl or quinolyl, including such groups having at least one halogen, carboxyl or nitrile substituent.

The maleamic acids are readily prepared by reacting at least one primary monoamine with maleic anhydride. Examples of representative primary amines include, without limitation thereto, methylamine, ethylamine, n-propylamine, isopropylamine, n-butylamine, sec-butylamine, isobutylamine, tert-butylamine, n-hexylamine, n-dodecylamine, benzylamine, cyclohexylamine, aniline and ethylanilines.

Synthesis of the maleamic acid proceeds virtually stoichiometrically, preferably employing from 0.8 to 1.5, most preferably 0.9 to 1.2, moles of primary amine per mole of maleic anhydride. The reaction is preferably effected in the presence of an organic solvent such as methylene chloride.

The interpolymerization of vinylaromatic monomers with maleamic monocarboxylic acid monomers to prepare the imide-containing vinylaromatic polymers in accordance with the present invention may be carried out in the presence of suitable solvents under reaction conditions normally employed for the solution polymerization of vinylaromatic monomers.

The imide-containing polymers are preferably formed by mixing from 70 to 95 weight percent of at least one vinylaromatic monomer and from 5 to 30 weight percent of at least one maleamic monocarboxylic acid monomer. The vinylaromatic monomer can be replaced with up to 30 percent of non-vinylaromatic monomers which are copolymerizable with vinylaromatic monomers. A currently desirable copolymer comprises from 15 to 30 weight percent of acrylonitrile, 55 to 80 percent of styrenic monomer and 5 to 30 weight percent of maleamic monocarboxylic acid monomer. Styrene is the currently preferred vinylaromatic monomer and when copolymerized with one or more other vinylaromatic monomers and/or non-vinylaromatic monomers, the amount of styrene is preferably at least 50 percent of the polymerizable monomer charge.

The polymerizable monomers may be combined with from 2 to 30 weight percent of an inert liquid diluent, including dimethylformamide or aromatic hydrocarbons such as toluene, benzene, ethylbenzene, xylene or the like. The aromatic liquid diluents are currently preferred, with ethylbenzene and xylene being the most preferred.

Substantially any of the known free radical polymerization catalysts, may be employed in the polymerization reactions of the invention if desired. The polymerization is effected at solution polymerization conditions which are commonly employed in polymerization of styrene-type monomers. Such reaction conditions are well known. Preferably the polymerization is conducted at temperatures from 25° C. to 200° C. Beneficially under such conditions in situ imidization occurs through loss of water. Although not necessary for success of the dehydration process a suitable dehydration catalyst, especially an acid may be employed to assist in the imidization.

The invention also contemplates the preparation of impact resistant, heat resistant polymers obtained by polymerizing at least one vinylaromatic monomer and at least one maleamic monocarboxylic acid monomer in the presence of 5 to 20 percent by weight of an elastomer phase. A variety of elastomers may be employed as the elastomeric substrate in forming impact styrenic thermoplastic compositions of the invention including conjugated 1,3-diene rubbers, ethylene-propylene-diene terpolymer rubbers, acrylate-diene interpolymer rubbers, nitrile rubbers, and mixtures thereof. The preferred rubbers are diene rubbers or mixtures of diene rubbers of one or more conjugated 1,3-dienes such as butadiene, isoprene, piperylene and chloroprene. Such rubbers include homopolymers of conjugated 1,3-dienes and interpolymers of such 1,3-dienes with up to an equal amount by weight of one or more copolymerizable monoethylenically unsaturated monomers, including the vinylaromatic monomers and non-vinylaromatic monomers described above.

The high impact heat resistant vinylaromatic resin compositions of the invention are prepared by polymerizing the polymerizable monomer mixtures comprising vinylaromatic monomers and, optionally, non-vinylaromatic monomers, in combination with the maleamic monocarboxylic acid monomer in the presence of preformed rubber substrates, generally in accordance with conventional solution polymerization conditions. In such solution polymerizations, the preformed rubber substrate is preferably dissolved in the monomers and this mixture is polymerized to graft at least a portion of a polymer on the rubber substrate. The rubber particles in the high impact, heat resistant styrenic resin compositions which result are dispersed throughout the rigid phase and will have a rigid phase grafted onto the substrate and the rubber particles will contain occlusions of grafted or ungrafted monomer.

The following examples illustrate the present invention and should not be construed to limit its scope. In the examples, all parts and percentages are by weight unless otherwise indicated.

EXAMPLE 1

Preparation of the Maleamic Monocaraboxylic Acid Monomer

A 70 percent solution of ethylamine in water was added to an equal molar amount of maleic anhydride dissolved in methylene chloride and cooled to approximately 0° C. The desired ethylmaleamic acid product formed as a white precipitate in the solution. The N-ethylmaleamic acid was isolated by filtration and dried at 60° C. in vacuo.

EXAMPLE 2

Preparation of Imide Modified Polymer

A mixture comprising 60 parts by weight styrene, 25 parts by weight acrylonitrile and 15 parts by weight N-ethylmaleamic acid is reacted at a temperature of 125° C. under thermal polymerization conditions in the substantial absence of a dehydration catalyst. There was separately recovered a terpolymer of styrene-acrylonitrile-ethylmaleimide which has a glass transition temperature of 122° C. Evidence for the formation of the ethylmaleimide terpolymer is confirmed by IR spectroscopy.

EXAMPLE 3

Preparation of Imide Modified Polymers

Following the procedure of the preceding example 2, phenylmaleamic acid and methylmaleamic acid were substituted for the ethylmaleamic acid to obtain terpolymers of styrene/acrylonitrile/phenylmaleimide, and styrene/acrylonitrile/methylmaleimide terpolymers, respectively.

It is understood that the above are merely preferred embodiments and that various changes and alterations can be made without departing from the spirit and broader aspects of the invention.

The embodiments of the invention in which an exclusive property or privilege is claimed are defined as follows:

1. A process for preparing imide-containing vinylaromatic polymers comprising polymerizing under free radical polymerization conditions in the substantial absence of a dehydration cyclization catalyst, a polymerizable monomer composition comprising at least one vinylaromatic monomer and at least one maleamic monocarboxylic acid monomer, to form a vinylaromatic monomer-maleamic monocarboxylic acid polymer which is in situ dehydrated and cyclized to form an imide-containing vinylaromatic polymer, and subsequently recovering said imide-containing vinylaromatic polymer.

2. A process according to claim 1 wherein said polymerizable monomer composition includes at least one unsaturated non-vinylaromatic monomer which is copolymerizable with said at least one vinylaromatic monomer.

3. A process according to claim 1 wherein said vinylaromatic monomer comprises styrene.

4. A process according to claim 2 wherein said non-vinylaromatic monomer comprises acrylonitrile.

5. A process according to claim 3 wherein said maleamic acid monomer comprises N-ethylmaleamic acid.

6. A process according to claim 4 wherein said maleamic acid monomer comprises N-ethylmaleamic acid.

7. A process according to claim 4 wherein said maleamic acid monomer comprises N-phenylmaleamic acid.

8. A process according to claim 4 wherein said maleamic acid monomer comprises N-methylmaleamic acid.

9. A process according to claim 1 wherein the amount of said vinylaromatic monomer is in the range from 70 to 95 percent by weight, based upon the weight of said polymerizable monomer composition.

10. A process according to claim 9 wherein said polymerizable monomer composition includes up to 30 percent by weight of at least one unsaturated non-vinylaromatic monomer which is copolymerizable with said at least one vinylaromatic monomer.

11. A process according to claim 10 wherein the amount of said unsaturated non-vinylaromatic monomer is in the range from 15 to 30 weight percent and the amount of said maleamic acid is in the range from 5 to 30 weight percent, based on weight of said polymerizable monomer composition.

12. A process according to claim 9 wherein said vinylaromatic monomer comprises styrene.

13. A process according to claim 11 wherein said non-vinylaromatic monomer comprises acrylonitrile.

14. A process according to claim 12 wherein said maleamic acid monomer comprises N-ethylmaleamic acid.

15. A process according to claim 13 wherein said maleamic acid monomer comprises N-ethylmaleamic acid.

16. A process according to claim 13 wherein said maleamic acid monomer comprises N-phenylmaleamic acid.

17. A process according to claim 13 wherein said maleamic acid monomer comprises N-methylmaleamic acid.